(12) United States Patent
Veltrop et al.

(10) Patent No.: US 6,520,380 B1
(45) Date of Patent: Feb. 18, 2003

(54) DISPENSER FOR LIQUID PRODUCTS

(75) Inventors: Loren J. Veltrop, Deerfield, IL (US); Lawrence G. Banovez, Kenoshi, WI (US)

(73) Assignee: Prince Castle, Inc., Carol Stream, IL (US)

( * ) Notice: Subject to any disclaimer, the term of this patent is extended or adjusted under 35 U.S.C. 154(b) by 0 days.

(21) Appl. No.: 10/012,129

(22) Filed: Nov. 29, 2001

(51) Int. Cl.⁷ .................................................. B67D 5/52
(52) U.S. Cl. ..................... 222/135; 222/137; 222/144.5; 222/472
(58) Field of Search ................................ 222/137, 135, 222/144.5, 324, 341, 386, 496, 472, 474, 470

(56) References Cited

U.S. PATENT DOCUMENTS

| | | |
|---|---|---|
| 1,353,386 A | 9/1920 | Erb |
| 2,636,647 A | 4/1953 | Covitt et al. |
| 3,150,802 A | 9/1964 | Pribyl |
| 3,260,419 A | 7/1966 | Weimer et al. |
| 4,413,972 A | 11/1983 | Lawson |
| 5,462,203 A | 10/1995 | Stern |
| 5,469,988 A | 11/1995 | Huang |
| 5,749,495 A | 5/1998 | Stern |
| 5,934,573 A | 8/1999 | Wetterings |

*Primary Examiner*—Philippe Derakshani
(74) *Attorney, Agent, or Firm*—John R. Hoffman

(57) ABSTRACT

A liquid dispenser is provided for dispensing either one or both of two liquid products and includes a housing defining two liquid reservoirs. Two pump assemblies are respectively mounted in the liquid reservoirs for incrementally feeding two different liquid products out of two respective discharge outlets. Two operating levers are articulatably mounted on the housing and are respectively operatively associated with the two pump assemblies. One lever is effective to dispense one liquid product. The second lever is effective to dispense the second liquid product. The second lever is selectively operatively associated with the first lever to dispense both liquid products.

20 Claims, 7 Drawing Sheets

DISPENSER FOR LIQUID PRODUCTS

FIELD OF THE INVENTION

This invention generally relates to the art of dispensers and, particularly, to a dispenser for fluid or liquid products.

BACKGROUND OF THE INVENTION

A variety of dispensers have been designed for manually handling dling and feeding fluid or liquid products in restaurants or the like. For instance, dispensers are used for feeding viscous condiments such as ketchup, mustard or similar sauces onto food items such as hamburger bread rolls or the like.

In large volume food handling operations such as fast-food restaurants and/or drive-in restaurants, condiments such as ketchup or mustard typically are applied to food products such as hamburgers prior to the sale of the hamburgers to customers. In such instances, it is important and desirable that the condiments be applied in uniform quantities and predetermined patterns to maintain a uniformity in the taste of the food product as well as to maintain cost parameters. With a hamburger, for instance, condiments originally were applied by one dispenser containing ketchup and a second dispenser containing mustard. Unfortunately, the use of multiple dispensers is not cost effective and slows down processing the food products in high volume food handling operations.

Because of these problems, dual dispensers have been designed for dispensing at least two different condiments using a single dispenser. In at least one instance, a dispenser has been designed to dispense two condiments either separately or together. Unfortunately, such dispensers create further problems because they must be manipulated or adjusted in order to change the dispensing mode. The present invention is directed to solving these problems by providing a dual liquid dispenser for dispensing either one or both of two liquid products without any adjustments whatsoever to the dispenser when dispensing in the different modes.

SUMMARY OF THE INVENTION

An object, therefore, of the invention is to provide a new and improved liquid dispenser for dispensing either one or both of two liquid products.

In the exemplary embodiment of the invention, the dispenser includes housing means defining first and second liquid reservoirs with respective first and second discharge outlets. First and second pump assemblies are provided respectively in the first and second liquid reservoirs for incrementally feeding first and second liquid products, respectively, out of the first and second discharge outlets. A first operating lever is articulatably mounted on the housing means and is operatively associated with the first pump assembly to feed the first liquid product out of the first discharge outlet. A second operating lever is articulatably mounted on the housing means and is operatively associated with the second pump assembly to feed the second liquid product out of the second discharge outlet. The second operating lever is selectively operatively associated with the first operating lever to feed both food products out of both discharge outlets.

As disclosed herein, the first and second liquid reservoirs are located in a side-by-side relationship on the housing means. The first and second discharge outlets are located in a common discharge area of the housing means. The first and second operating levers are operatively associated with the first and second pump means, respectively, by elongated pistons in the respective liquid reservoirs. The second operating lever is selectively operatively associated with the first operating lever by selective engagement therewith.

According to a specific aspect of the invention, the first operating lever is pivotally mounted to the housing means at one end thereof, with an opposite end thereof being located for manual manipulation by an operator. Both opposite ends of the second operating lever are articulatably mounted on the housing means, with the second operating lever being operatively associated with the second pump means at a point intermediate opposite ends of the second operating lever. Therefore, movement of either opposite end of the second operating lever is effective to actuate the second pump assembly. However, only one end of the second operating lever is effective to pivot the first operating lever.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
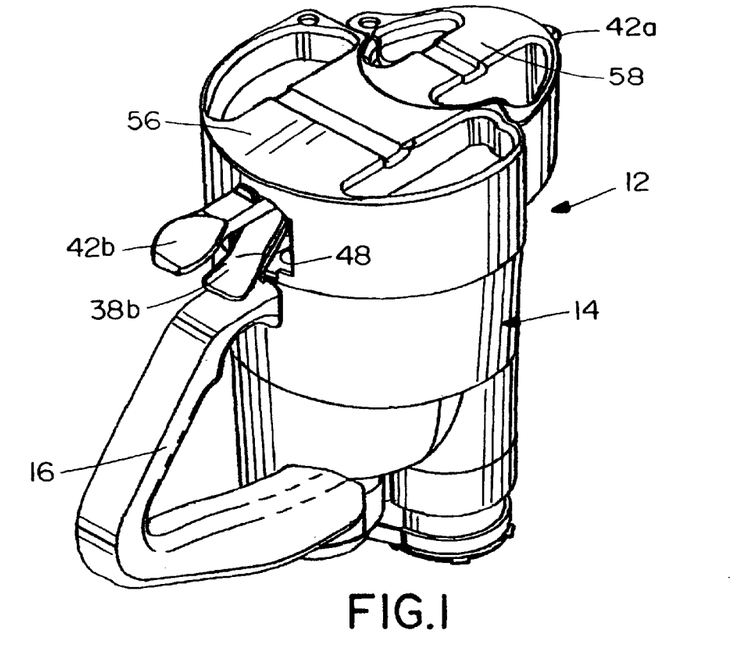
FIG. 1 is a top perspective view of a dual dispenser embodying the concepts of the invention.
Figure 2:
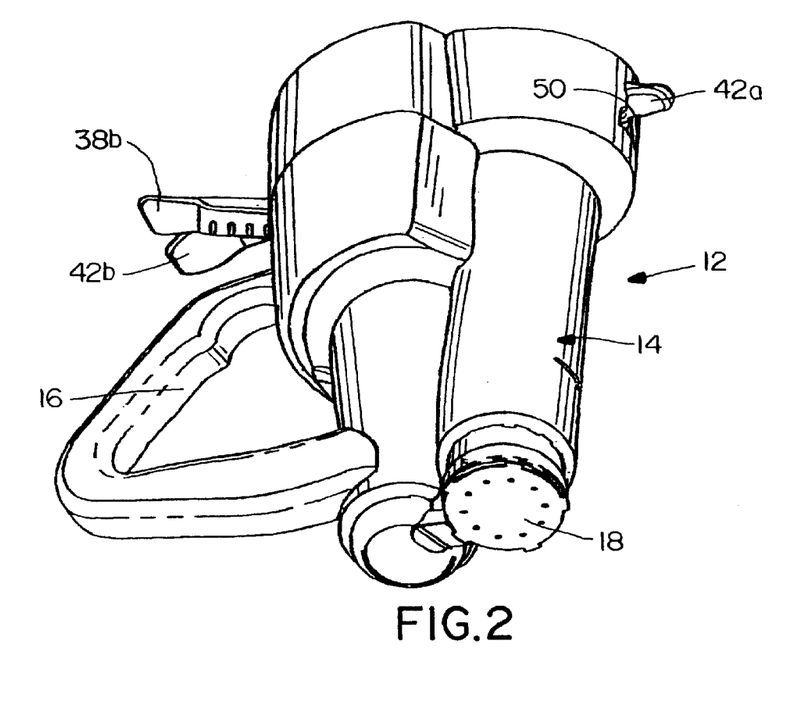
FIG. 2 is a bottom perspective view of the dual dispenser.

Referring to the drawings in greater detail, and first to FIGS. 1–5, the invention herein is embodied in a dual liquid dispenser, generally designated 12, for dispensing either one or both of two liquid products, such as viscous condiments like ketchup and mustard. The dispenser includes a housing or housing means, generally designated 14, which may be molded of plastic material. A handle 16 is formed at a rear of the housing for manual grasping by an operator to manipulate the dispenser. As seen in FIG. 2, a common discharge area 18 is located at the bottom of the dispenser.

Figure 6:
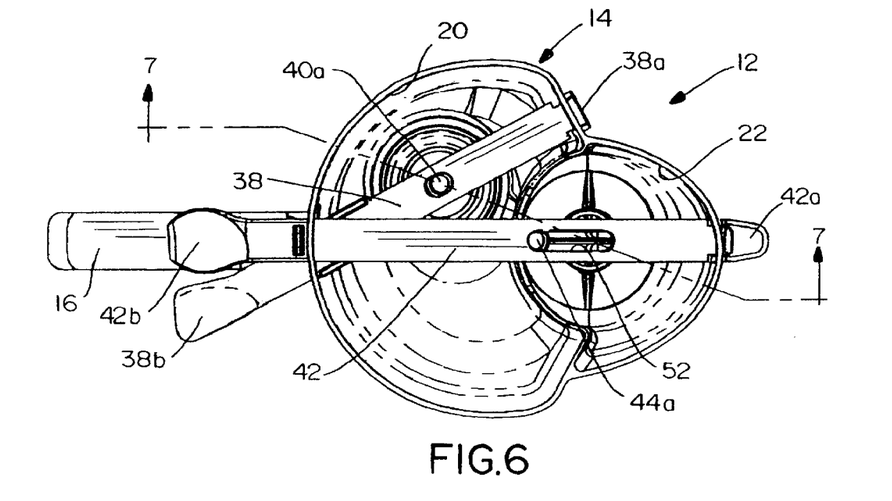
FIG. 6 is a top plan view of the dispenser, with the covers removed.
Figure 7:
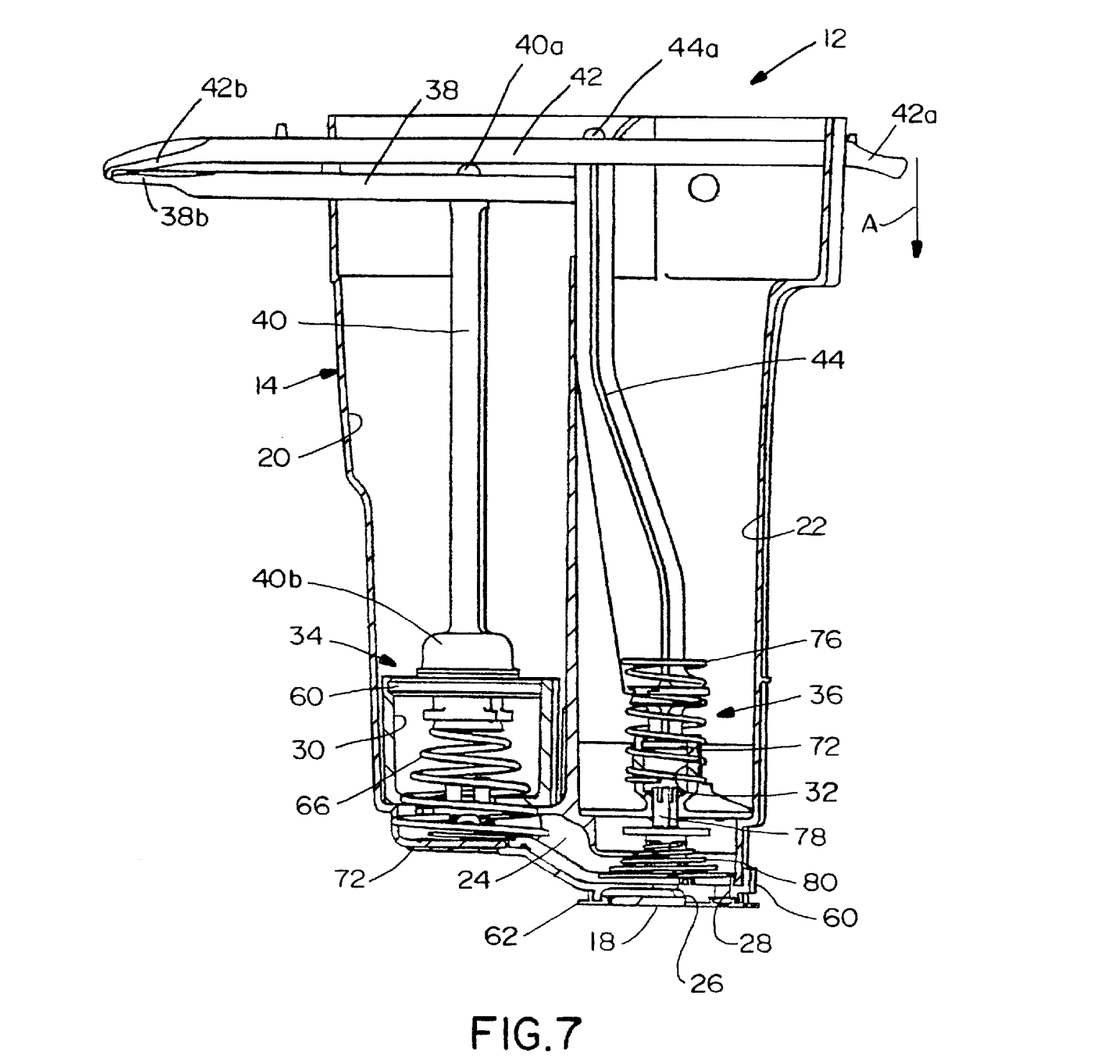
FIG. 7 is a vertical section taken generally along line 7—7 of FIG. 6.

Referring to FIGS. 6 and 7 in conjunction with FIGS. 1–5, housing 14 is divided into first and second liquid reservoirs 20 and 22, respectively, which hereinafter will be referred to as the ketchup and mustard reservoirs 20 and 22, respectively. A passage 24 (FIG. 7) communicates ketchup reservoir 20 with a first or ketchup discharge outlet 26. A second or mustard discharge outlet 28 communicates with mustard reservoir 22. A ketchup chamber 30 (FIG. 7) is located at the bottom of ketchup reservoir 20, and a mustard chamber 32 is located at the bottom of mustard reservoir 22. The chambers are appropriately fixed within the bottoms of the reservoirs. A first pump assembly, generally designated 34 (FIG. 7) is operatively associated with ketchup chamber 30, and a second pump assembly, generally designated 36, is operatively associated with mustard chamber 32.

The invention centers around a unique lever arrangement which includes a first or ketchup operating lever 38 articulatably mounted on housing 14 and operatively associated with first pump assembly 34 through a piston 40 (FIG. 7) to feed ketchup from chamber 30 out of ketchup discharge outlet 26. A second or mustard operating lever 42 is articulatably mounted on housing 14 and is operatively associated through a piston 44 (FIG. 7) to feed mustard from chamber 32 out of mustard discharge outlet 28.

Figure 3:
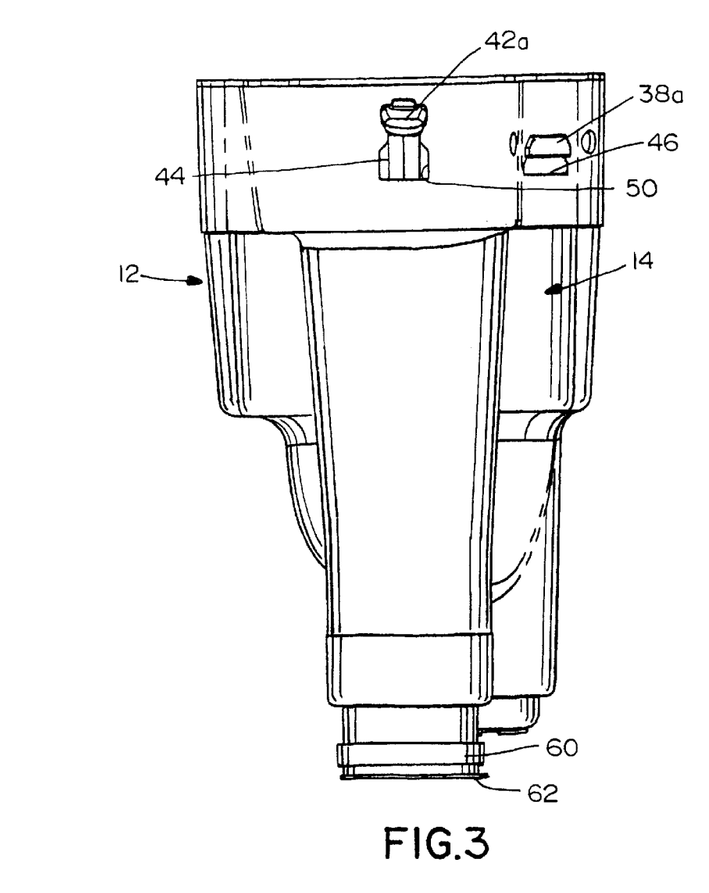
FIG. 3 is a front elevational view of the dispenser.
Figure 4:
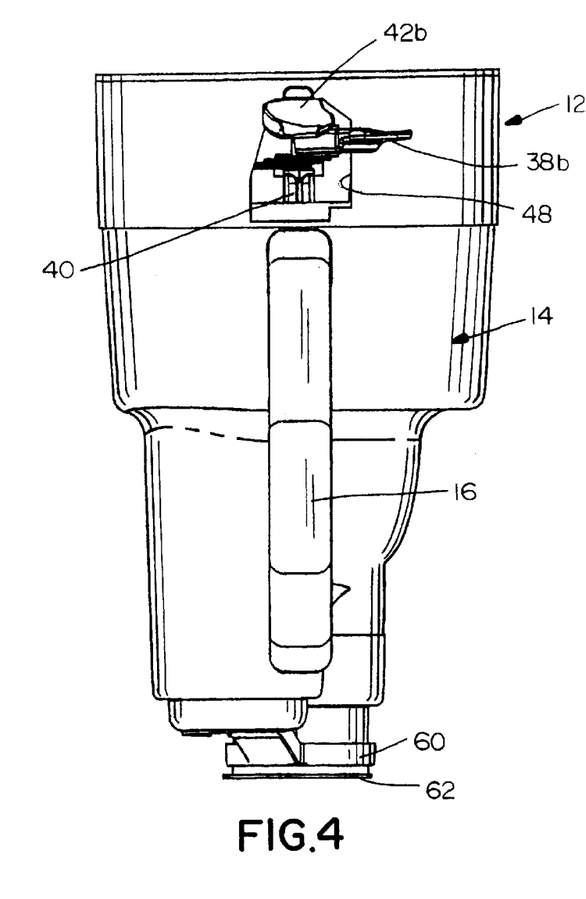
FIG. 4 is a rear elevational view of the dispenser.
Figure 5:
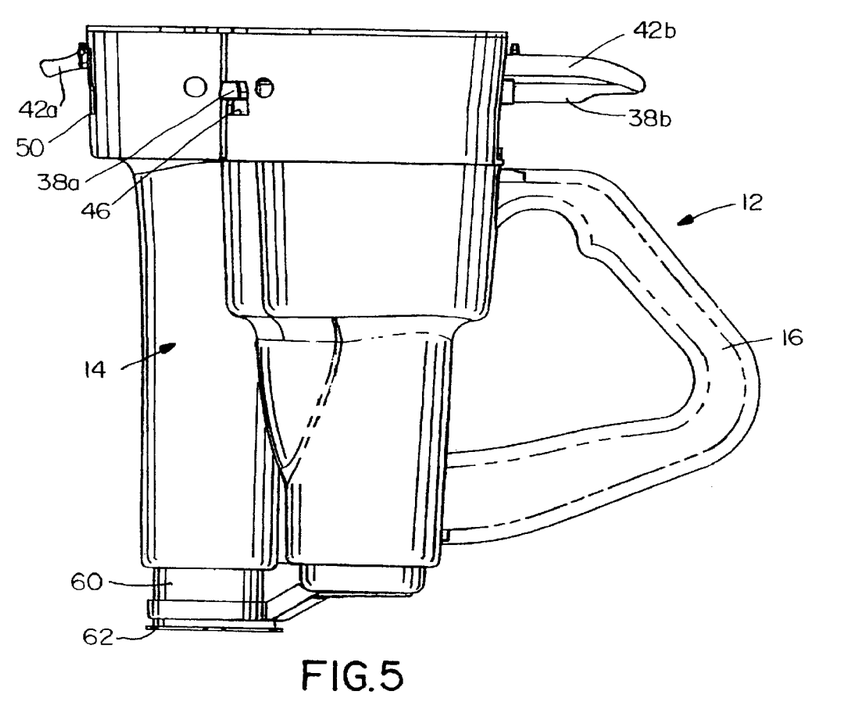
FIG. 5 is a side elevational view of the dispenser.

As best seen in FIGS. 3 and 7, one end 38a of ketchup lever 38 is captured within an opening 46 (FIG. 3) in housing 14 whereby the ketchup lever is pivotally mounted to the housing at end 38a. As best seen in FIG. 1, an opposite end 38b of ketchup lever 38 projects through a vertically enlarged opening 48 at the rear of housing 14. A top distal end 40a of piston 40 (FIG. 7) projects through ketchup lever 38 intermediate opposite ends 38a and 38b thereof as seen clearly in FIG. 6. Therefore, as an operator grasps handle 16 by the operator's fingers and palm of one hand, the operator can use his or her thumb to depress end 38b of ketchup lever 38 downwardly to dispense an incremental amount of ketchup out of chamber 30, as end 38a of the lever and opening 46 (FIG. 3) of the housing act as a fulcrum point for the ketchup lever. Of course, the size of ketchup chamber 30 determines the incremental amount of ketchup to be dispensed.

One end 42a of mustard lever 42 projects through a vertically enlarged opening 50 (FIG. 3) at the front of housing 14. An opposite end 42b of the mustard lever projects through vertically enlarged opening 48 (FIG. 1) at the rear of housing 14. As clearly seen in FIG. 6, mustard lever 42 extends at an angle to ketchup lever 38 and overlaps the ketchup lever. An upper distal end 44a of piston 44 (FIG. 7) projects through an elongated opening 52 in mustard lever 42. With this structural arrangement, when an operator desires to dispense an incremental amount of mustard from dispenser 12, the operator holds handle 16 with one hand and pushes down on end 42a of mustard lever 42 with his or her opposite hand, as opposite end 42b of the lever acts as a fulcrum within opening 48 in the housing. Downward movement of the mustard lever in the direction of arrow "A" (FIG. 7) is effective to dispense an incremental amount of the mustard from chamber 32 out of mustard discharge outlet 28.

If it is desirable to dispense both mustard and ketchup from dispenser 12, an operator grasps handle 16 similar to dispensing ketchup as described above, and the operator uses his or her thumb to push downwardly on end 42b of mustard lever 42 in the direction of arrow "B" (FIGS. 7 and 8), as opposite end 42a of the mustard lever now acts as a fulcrum bearing against the top of opening 50 (FIG. 3) in the housing. Downward movement of end 42b of the mustard lever not only dispenses an incremental amount of mustard, but the mustard lever bears down on top of ketchup lever 38 to drive the ketchup lever down and simultaneously dispense an incremental amount of ketchup, as described above. It can be seen that both condiments are dispensed out of a common discharge area 18 by simply depressing end 42b of mustard lever 42 downwardly as the operator holds and operates the dispenser with a single hand.

Figure 8:
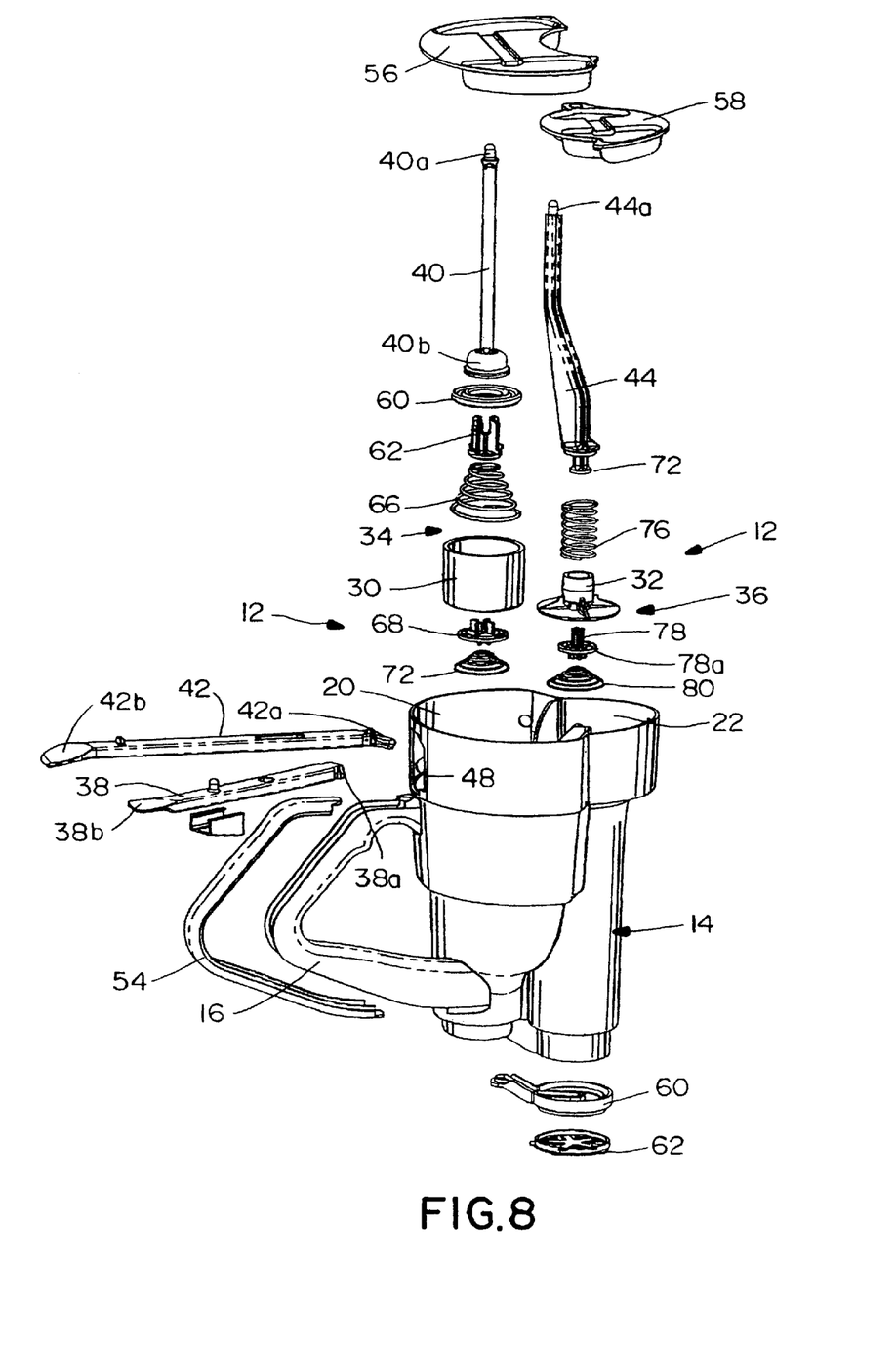
FIG. 8 is an exploded perspective view of the dispenser.
Figure 9:
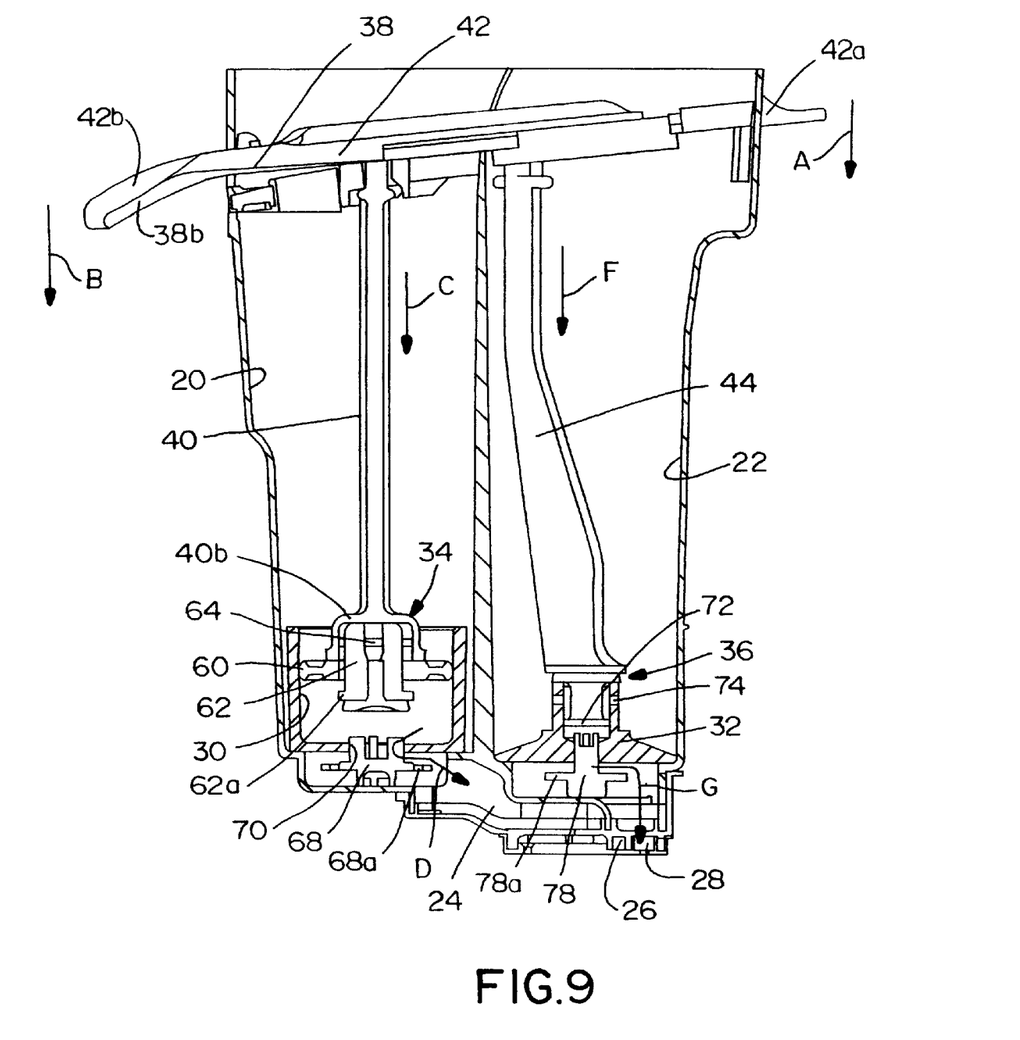
FIG. 9 is an enlarged section similar to that of FIG. 7, but with the springs removed and the dispenser in its dual dispensing mode.
Figure 10:
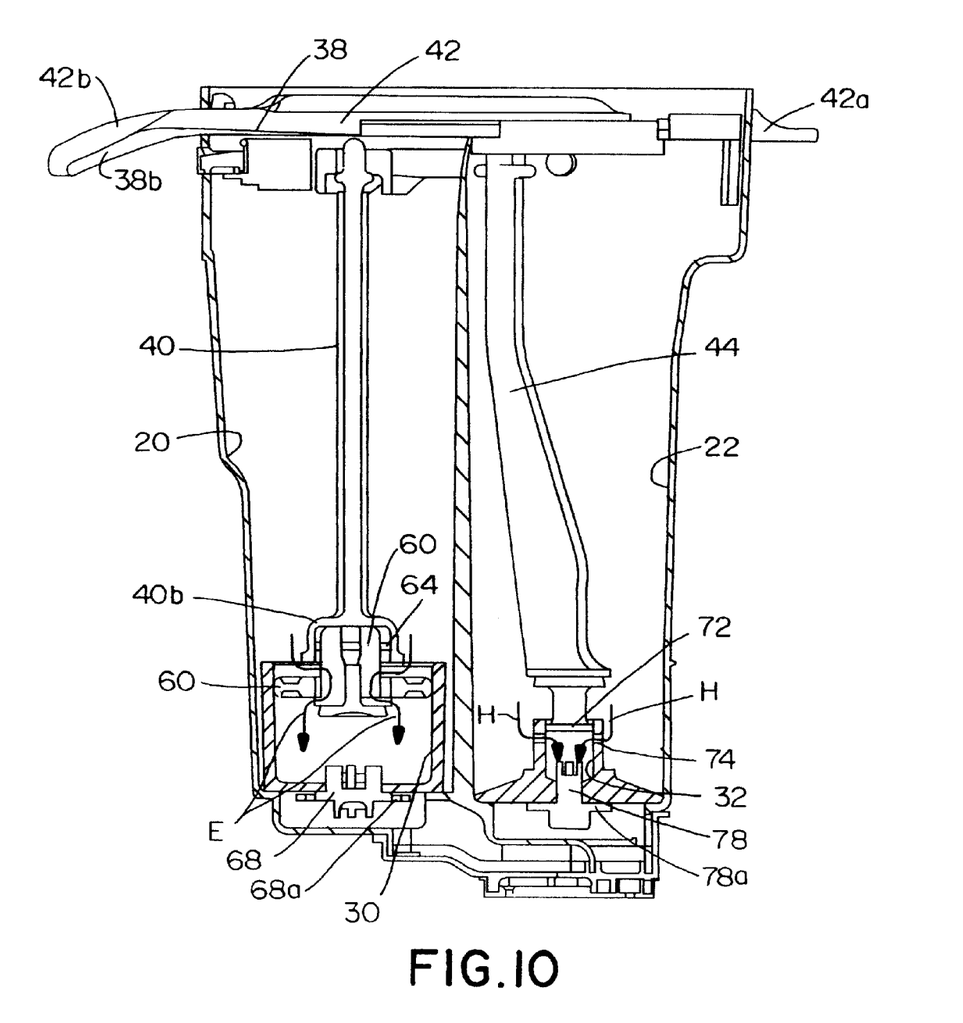
FIG. 10 is a view similar to that of FIG. 7, with the springs removed to facilitate the illustration.

Referring to FIG. 8 in conjunction with FIGS. 9 and 10, the components of pump assemblies 34 and 36 (FIG. 7) are shown in greater detail. However, it should be understood that the pump assemblies can be varied within the concepts of the invention, and the illustrated embodiment is but one example of types of pump assemblies which can be used with the unique dispenser herein. With that understanding, housing 14, handle 16, mustard lever 38, ketchup lever 40, pistons 40 and 44, as well as ketchup and mustard chambers 30 and 32 already have been described above. In addition, a cushioning cover 54 is shown in FIG. 8 for handle 16, and a pair of covers 56 and 58 are shown for ketchup and mustard chambers 20 and 22, respectively. Still further, a manifold 60 and an adjustable orifice plate 62 can be snapped over the bottom of housing 14 to define common discharge area 18 (FIG. 2). Finally, a metering adjustment clip 63 is snapped to the underside of lever 38 and is held thereto by an interference fit. However, the adjustment clip is slidable longitudinally of the lever to bring a stepped surface 62a into different positions of engagement with the bottom edge of opening 48. The clip limits the downward movement of the lever, and the stepped surface can vary the incremental amount of product dispensed with each stroke of piston 40.

Before proceeding, it should be noted that the pump springs and the check valve springs (described hereinafter) have been removed from FIGS. 9 and 10 in order to avoid cluttering the drawings and to provide a more clear and concise understanding of the respective components.

With that understanding, elongated piston 40 extends downwardly through ketchup reservoir 20 and terminates in an inverted cupped end 40b which engages a piston plate 60 which generally floats within ketchup chamber 30. A fluted member 62 is mounted within cupped end 40b of piston 40 by a pin 64. The fluted member has an outwardly projecting peripheral flange 62a at the bottom thereof. During operation as described below, piston plate 60 can establish a seal with flange 62a of fluted member 60 as well as establish a seal with the bottom periphery of cupped end 40b of piston 40. A pump coil spring 66 engages the bottom of fluted member 62 and normally biases the fluted member as well as piston 40 and ketchup lever 38 upwardly relative to housing 14 and ketchup reservoir 20. A fluted check valve 68 extends through an opening 70 in the bottom of ketchup chamber 30 and includes a peripheral flange 68a which can form a seal with the bottom of chamber 30. A check valve coil spring 72 normally biases fluted check valve 68 upwardly.

When it is desired to dispense ketchup either individually or with the mustard in a dual dispensing operation as described above, depressing end 38b of ketchup lever 38 downwardly in the direction of arrow "B" (FIG. 9) causes piston 40 to move downwardly in the direction of arrow "C". Cupped end 40b of the piston seals against piston plate 60, and the plate moves downwardly within ketchup chamber 30 against the biasing of pump coil spring 66. The ketchup within chamber 30 is forced downwardly against fluted check valve 68 which causes the check valve to move downwardly against the biasing of coil spring 72. Ketchup is forced between the flutes of check valve 68 through opening 70 in the direction of arrow "D" (FIG. 9) whereupon the ketchup is forced through passage 24 and out of ketchup outlet 26 (FIG. 7). Upon release of ketchup lever 38, check valve coil spring 72 biases fluted check valve 68 upwardly to establish a seal against the bottom of chamber 30 and close opening 70 in the chamber.

Simultaneously, pump coil spring 66 biases fluted member 62, cupped end 40b and piston 40 as well as ketchup lever 38 upwardly. This action is shown in FIG. 10. As fluted member 62 is biased upwardly, piston plate 60 engages flange 62a of the fluted member. A vacuum is created within mustard chamber 30 which draws ketchup from reservoir 20 around the bottom of cupped end 40b and between the flutes of fluted member 60 in the direction of arrows "E" (FIG. 10) until ketchup chamber 30 is filled. Once filled, piston plate 60 again forms a seal with the underside of cupped end 50b of the piston whereupon a subsequent downward or dispensing cycle can be performed. It can be seen that piston plate 60 floats vertically between the bottom of cupped end 40b of piston 40 and flange 62a of fluted member 62.

Mustard pump means 36 includes a piston plate 72 integrally formed with the bottom of piston 44 and disposed within mustard chamber 32. The mustard chamber has a plurality of side holes 74. A pump coil spring 76 (FIG. 8) is sandwiched between the housing of chamber 32 and the bottom of piston 44 as seen in FIG. 7 to normally bias the piston and piston plate 72 upwardly. A fluted check valve 78 has a peripheral flange 78a which forms a seal with the bottom of chamber 32 and is normally biased in sealing engagement therewith by a check valve coil spring 80 (FIGS. 7 and 8).

When it is desired to dispense a given increment of mustard, end 42a of mustard lever 42 is depressed in the direction of arrow "A" which forces piston 44 downwardly in the direction of arrow "F" (FIG. 9). Of course, this same action is effective during a dual condiment dispensing operation by depressing end 42b of the mustard lever as described above. Whether singly dispensing mustard or duly dispensing both mustard and ketchup, piston 44 is force downwardly within mustard reservoir 22 by depressing either opposite end of mustard lever 42.

When mustard piston 44 is force downwardly, piston plate 72 moves downwardly beyond side holes 74 in mustard chamber 32 and forces the mustard out of the chamber, between the flutes of fluted check valve 68 and through an opening 82 (FIG. 9) in the bottom of chamber 32. The mustard flows beyond the check valve in the direction of arrow "G" and out of mustard outlet 28. Upon release of mustard lever 42, check valve spring 80 biases check valve 78 upwardly, establishing a seal between peripheral 78a of the check valve and the bottom of chamber housing 32 as seen in FIG. 10. Piston coil spring 76 simultaneously biases piston 44 and integral piston plate 72 back upwardly until the piston plate clears side holes 74 of mustard chamber 32, whereupon the vacuum created in the mustard chamber causes mustard to flow from reservoir 22 through side holes 74 and into the mustard chamber in the direction of arrows "H" (FIG. 10). The dispenser now is ready for another dispensing cycle of operation.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A liquid dispenser for dispensing either one or both of two liquid products, comprising:

housing means defining first and second liquid reservoirs with respective first and second discharge outlets;

first and second pump assemblies respectively mounted in the first and second liquid reservoirs for incrementally feeding first and second liquid products, respectively, out of the first and second discharge outlets, respectively;

a first operating lever articulatably mounted on the housing means and operatively associated with the first pump assembly to feed the first liquid product out of the first discharge outlet;

a second operating lever articulatably mounted on the housing means and operatively associated with the second pump assembly to feed the second liquid product out of the second discharge outlet; and said second operating lever being selectively operatively associated with the first operating lever to feed both food products out of both discharge outlets.

2. The liquid dispenser of claim 1 wherein said first and second liquid reservoirs are located in a side-by-side relationship on the housing means.

3. The liquid dispenser of claim 1 wherein said first and second discharge outlets are located in a common discharge area of the housing means.

4. The liquid dispenser of claim 1 wherein said first operating lever is operatively associated with the first pump assembly by an elongated piston in the first liquid reservoir.

5. The liquid dispenser of claim 1 wherein said second operating lever is operatively associated with the second pump assembly by an elongated piston in the second liquid reservoir.

6. The liquid dispenser of claim 1 wherein said second operating lever is selectively operatively associated with the first operating lever by selective engagement therewith.

7. The liquid dispenser of claim 1 wherein said second operating lever is pivotally mounted to the housing means at one end of the second operating lever, an opposite end thereof being located for manual manipulation by an operator.

8. The liquid dispenser of claim 1 wherein said first operating lever is pivotally mounted to the housing means at one end of the first operating lever, an opposite end thereof being located for manual manipulation by an operator.

9. The liquid dispenser of claim 1 wherein said second operating lever is operatively associated with the second pump means at a point intermediate opposite ends of the second operating lever, both opposite ends of the second operating lever being articulatably mounted on the housing means whereby movement of either opposite end is effective to actuate the second pump assembly, while only one end of the second operating lever is effective to actuate the first operating lever.

10. A liquid dispenser for dispensing either one or both of two liquid products, comprising:

housing means defining first and second liquid reservoirs in a side-by-side relationship, the reservoirs having respective first and second discharge outlets located in a common discharge area of the housing means;

first and second pump assemblies respectively mounted in the first and second liquid reservoirs for incrementally feeding first and second liquid products, respectively, out of the first and second discharge outlets, respectively;

a first operating lever articulatably mounted on the housing means and operatively associated with the first pump assembly by an elongated piston in the first liquid reservoir to feed the first liquid product out of the first discharge outlet;

a second operating lever articulatably mounted on the housing means and operatively associated with the second pump assembly by an elongated piston in the second liquid reservoir to feed the second liquid product out of the second discharge outlet; and said second operating lever being selectively operatively associated with the first operating lever to feed both food products out of both discharge outlets.

11. The liquid dispenser of claim 10 wherein said second operating lever is selectively operatively associated with the first operating lever by selective engagement therewith.

12. The liquid dispenser of claim 10 wherein said second operating lever is pivotally mounted to the housing means at one end of the second operating lever, an opposite end thereof being located for manual manipulation by an operator.

13. The liquid dispenser of claim 10 wherein said first operating lever is pivotally mounted to the housing means at one end of the first operating lever, an opposite end thereof being located for manual manipulation by an operator.

14. The liquid dispenser of claim 10 wherein said second operating lever is operatively associated with the second pump means at a point intermediate opposite ends of the second operating lever, both opposite ends of the second operating lever being articulatably mounted on the housing means whereby movement of either opposite end is effective to actuate the second pump assembly, while only one end of the second operating lever is effective to actuate the first operating lever.

15. A liquid dispenser for dispensing either one or both of two liquid products, comprising:

housing means defining first and second liquid reservoirs with respective first and second discharge outlets;

first and second pump assemblies respectively mounted in the first and second liquid reservoirs for incrementally feeding first and second liquid products, respectively, out of the first and second discharge outlets, respectively;

a first operating lever operatively associated with the first pump assembly with one end of the lever pivotally mounted to the housing and an opposite end located for manual manipulation by an operator to feed the first liquid product out of the first discharge outlet; and a second operating lever operatively associated with the second pump assembly intermediate opposite ends of the second operatively lever, both opposite ends of the second operating lever being articulatably mounted on the housing such that movement of either opposite end is effective to actuate the second pump assembly to feed the second liquid product out of the second discharge outlet, while only one end of the second operating lever is operatively associated with the first operating lever to feed both food products out of both discharge outlets.

16. The liquid dispenser of claim 15 wherein said first and second liquid reservoirs are located in a side-by-side relationship on the housing means.

17. The liquid dispenser of claim 15 wherein said first and second discharge outlets are located in a common discharge area of the housing means.

18. The liquid dispenser of claim 15 wherein said first operating lever is operatively associated with the first pump assembly by an elongated piston in the first liquid reservoir.

19. The liquid dispenser of claim 15 wherein said second operating lever is operatively associated with the second pump assembly by an elongated piston in the second liquid reservoir.

20. The liquid dispenser of claim 15 wherein said second operating lever is located for engaging the first operating lever to effect actuation of the first operating lever.

* * * * *